United States Patent
Lozano Garcia et al.

(10) Patent No.: US 8,632,035 B2
(45) Date of Patent: Jan. 21, 2014

(54) ADJUSTABLE IRON FITTING FOR THE INSTALLATION AND FITTING OF AIRCRAFT FAIRING

(75) Inventors: Jose Luis Lozano Garcia, Madrid (ES); Gonzalo Ramirez Blanco, Madrid (ES)

(73) Assignee: Airbus Operations, S.L., Mardrid (ES)

( * ) Notice: Subject to any disclaimer, the term of this patent is extended or adjusted under 35 U.S.C. 154(b) by 195 days.

(21) Appl. No.: 13/339,776

(22) Filed: Dec. 29, 2011

(65) Prior Publication Data
US 2012/0168563 A1    Jul. 5, 2012

(30) Foreign Application Priority Data

Dec. 31, 2010    (ES) .................................. 201032020

(51) Int. Cl.
*B64C 1/06*    (2006.01)
(52) U.S. Cl.
USPC .......................................... 244/131; 244/132
(58) Field of Classification Search
USPC .................. 244/131, 132, 119, 123.1, 117 R
See application file for complete search history.

(56) References Cited

U.S. PATENT DOCUMENTS

| | | | | |
|---|---|---|---|---|
| 6,889,939 B2* | 5/2005 | Rouyre et al. | ................ | 244/131 |
| 7,887,009 B2* | 2/2011 | Keeler et al. | .................. | 244/131 |
| 8,177,169 B2* | 5/2012 | Lobo Barros et al. | ........ | 244/131 |
| 2003/0168554 A1* | 9/2003 | Rouyre et al. | ................ | 244/131 |
| 2006/0032982 A1* | 2/2006 | Stephens | ....................... | 244/131 |
| 2012/0248248 A1* | 10/2012 | Thompson | .................... | 244/130 |

* cited by examiner

*Primary Examiner* — Christopher P Ellis
(74) *Attorney, Agent, or Firm* — Oblon, Spivak, McClelland, Maier & Neustadt, L.L.P.

(57) ABSTRACT

It is intended for installing and fitting, in conjunction with other iron fittings, a fairing on an aircraft in correspondence with a housing located at the junction of a stabilizer and a fuselage of an aircraft structure. Wherein each iron fitting comprises:
a base plate (5) joined integrally to a torsion box (6) of the stabilizer (3);
a mobile support (7) joined integrally to the fairing (1) and which is guided, over a linear movement, over the base plate (5);
an adjustment screw (8) that is coupled into a threaded opening (15) of the base plate (5), which screw joins this base plate (5) to the mobile support (7), with the rotation of said adjustment screw (8) in combination with a retaining plate (23) dragging the respective mobile support (7) that is integral to the fairing (1).

12 Claims, 6 Drawing Sheets

ADJUSTABLE IRON FITTING FOR THE INSTALLATION AND FITTING OF AIRCRAFT FAIRING

OBJECT OF THE INVENTION

This invention, as stated in the title of this description, relates to an adjustable iron fitting for the installation and fitting of an aircraft fairing that allows the fine and accurate adjustment of the fairing it supports, also allowing this adjustment to be easily accessible from outside and to be performed with the fairing entirely installed.

More specifically, the adjustable iron fitting of the invention has been developed to support fairings that cover the hollow that lies between the fuselage and the stabiliser of an aeronautical structure, when said stabiliser allows trimming movements.

Therefore, the use of adjustable and accessible iron fittings significantly reduces the adjustment tasks during the assembly process.

It should also be pointed out that the iron fitting of the invention allows the use of fastening components to fasten it to the aircraft structure that will not cause problems when in service and that do not require access for installation and maintenance.

BACKGROUND OF THE INVENTION

The type of supports used to date for installing and adjusting an aircraft fairing is based on an iron fitting which comprises a first part integrally joined to the torsion box by stud pins and a second part joined to the fairing itself.

The joint between these two parts of the iron fitting allows it to slide over a grooved surface that is locked when assembling and applying the tightening torque to the nuts that support it on the free stud of the stud pins mentioned above.

This adjustment has the drawback of requiring access to the installation area of the nuts, which is inside the fairing, since it is essential that the supports are sheltered from the fairing in order not to penalize the aircraft aerodynamics.

This need for access turns the adjustment process into a laborious process, since it requires an iterative or repetitive assembly process, control by calibration gauges and disassembly until achieving the optimal fairing position.

DESCRIPTION OF THE INVENTION

In order to reach the objectives and avoid the drawbacks mentioned in previous sections, the present invention proposes an adjustable iron fitting for the installation and fitting of aircraft fairings, being especially applicable to fairings that cover the cavities located at the junction areas existing between a stabiliser and a fuselage of an aircraft structure, such that the installation of these fairings must be adapted to possible deviations in the geometry of both the stabiliser itself and the fuselage that must be covered. These fairings must therefore have an adjustment system that allows adjusting the distance of the fairing installed.

Under this premise, the iron fitting of the invention is characterised in that it comprises:
- a base plate integrally joined to a torsion box of the stabiliser.
- a mobile support integrally joined to the fairing and which is guided, over a linear movement, over said base plate.
- an adjustment screw that is coupled into a threaded opening of the base plate, which screw joins this base plate to the mobile support, with the rotation of said adjustment screw dragging the fairing along the guides of the mobile support, either linearly by the adjustment screw and in the opposite linear direction via a retaining plate associated to the adjustment screw.

The base plate is characterised in turn in that it comprises a lower base and a central body provided with the threaded opening into which the adjustment screw is coupled, the lower base also incorporating side channels that line the central body and on which the mobile support is coupled and guided during its linear movement for installing and adjusting the fairing against the outer side of the fuselage.

The mobile support is characterised in that it comprises a bridge structure that is adapted to the central body of the base plate, which bridge structure extends outwards in two coplanar extensions that are adjusted and slide into the side channels of the base plate.

Another feature of the invention is that the bridge structure of the mobile support is joined on one end to a front wall that is also part of said mobile support. Said front wall is split by a lower recess in the front base of which is provided a through hole opposite the threaded opening of the central body of the base plate, the head of the adjustment screw being housed in such lower recess opposite a notch in the fairing that allows access to the head of the adjustment screw from outside, such that the rotation in one direction of such adjustment screw drags by the head such mobile support and therefore the fairing, which is frontally adjusted against the inside of the fuselage with an intermediate sealing profile that is perimetrally fixed on to the corresponding fairing, which shifts in turn in the direction of the guide of the mobile support during its installation and fitting. When the adjustment screw rotates in the opposite sense, it drags the mobile support outwards by the retaining plate associated to the adjustment screw.

The mobile support includes a longitudinal rib joined to an upper portion of the front wall and which is also joined to the bridge structure of the mobile support.

The base plate is permanently joined, for example via rivets, to the surface of the component that must support the fairing (in this case the stabiliser's torsion box). Since this coupling is fixed and permanent it is not subject to potential issues of lack of tightening torque in these fastenings. On the other hand, it prevents the need for access to the boxes for installing the closing nuts of the traditional stud pins, such that these access areas penalize the structure by increasing its weight.

The base plate comprises two independent parts: a first part determined by its lower base and a second part formed by a central body that is joined to the lower base at at least two anchor points. This configuration facilitates the manufacture of the base support, reducing the sophistication of the machining of the side channels.

Another feature of the invention is that the two independent parts of the base plate are joined to one another by a first screw that crosses the lower base and is threaded into a threaded hole located in the lower portion of the central body and a second screw in combination with a nut, said second screw crossing the lower base and an end extension that is an extension of the central body.

The retaining plate is characterised in that it comprises an open recess the edge of which is adjusted into a ring groove of the adjustment screw, coming into contact with the retaining plate against the inner side of the front base of the mobile support, whereas the head of the adjustment screw abuts against the outer face of said front base with an intermediate retaining and stopping ring for the adjustment screw.

The iron fitting is also characterised in that it comprises anti-rotation locking means for the safety washer and the retaining plate. Said anti-rotation locking means consist in a retaining element that crosses a portion of the safety washer, the front base of the mobile support and also crosses a lower portion of the retaining plate.

In order to reinforce the locking of the inappropriate rotation of the adjustment screw the present invention has provided a projection that is integral to a closing lid of the notch in the fairing. The notch is opposite the lower recess of the mobile support, such that such rib additionally adjusts into a front hollow of the head of the adjustment screw. The purpose of the retaining washer is to stop the adjustment screw. This washer is joined to the iron fitting via a pin (retaining element), and once the mobile support is adjusted, by folding one of the flaps of the washer against one of the sides of the hexagonal screw head, this prevents it from rotating.

The iron fittings of the invention are thus different from those existing in the market in the following points:
   they have an adjustment screw that allows their adjustment;
   they do not require the use of stud pins for installation, thus avoiding problems in service or during adjustment;
   they allow adjustment from outside, with the resulting time savings.

In order to aid towards a better understanding of this specification and as an integral part thereof, shown below are drawings in which the object of the invention has been represented with an illustrative and non-limiting nature.

DESCRIPTION OF A PREFERRED EMBODIMENT OF THE INVENTION

Figure 1:
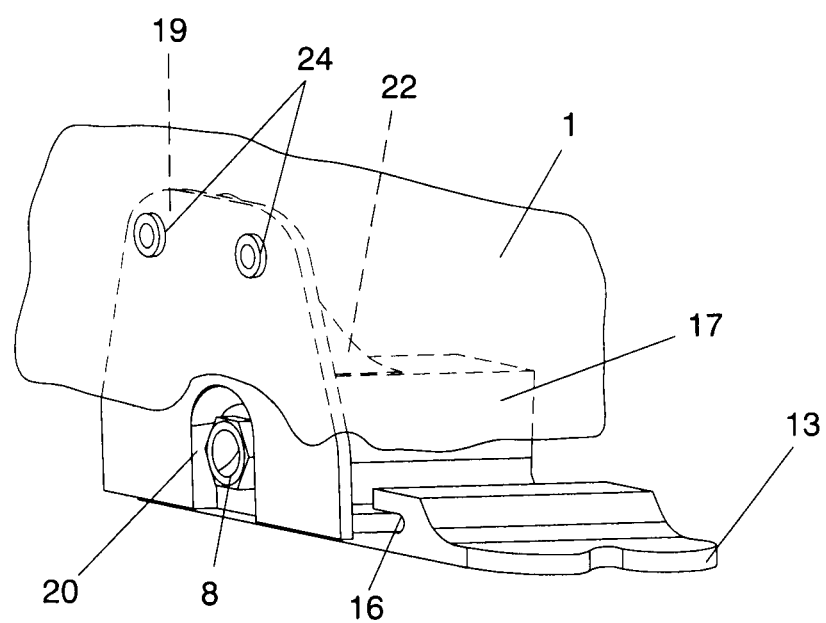
FIG. 1.—Shows a perspective view of the adjustable iron fitting for the installation and fitting of an aircraft fairing object of the invention.
Figure 2:
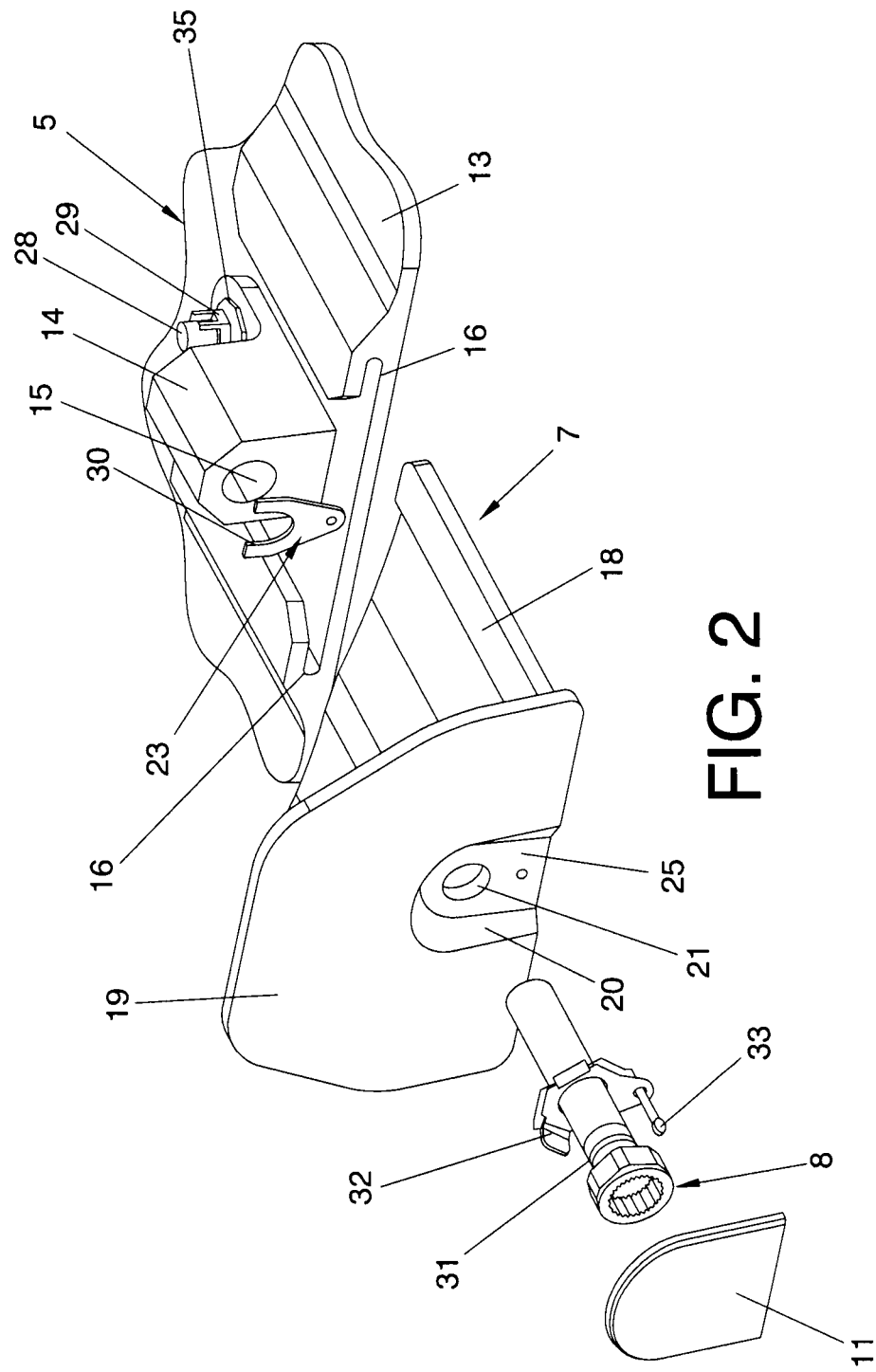
FIG. 2.—Shows an exploded view of the iron fitting of the invention.
Figure 3:
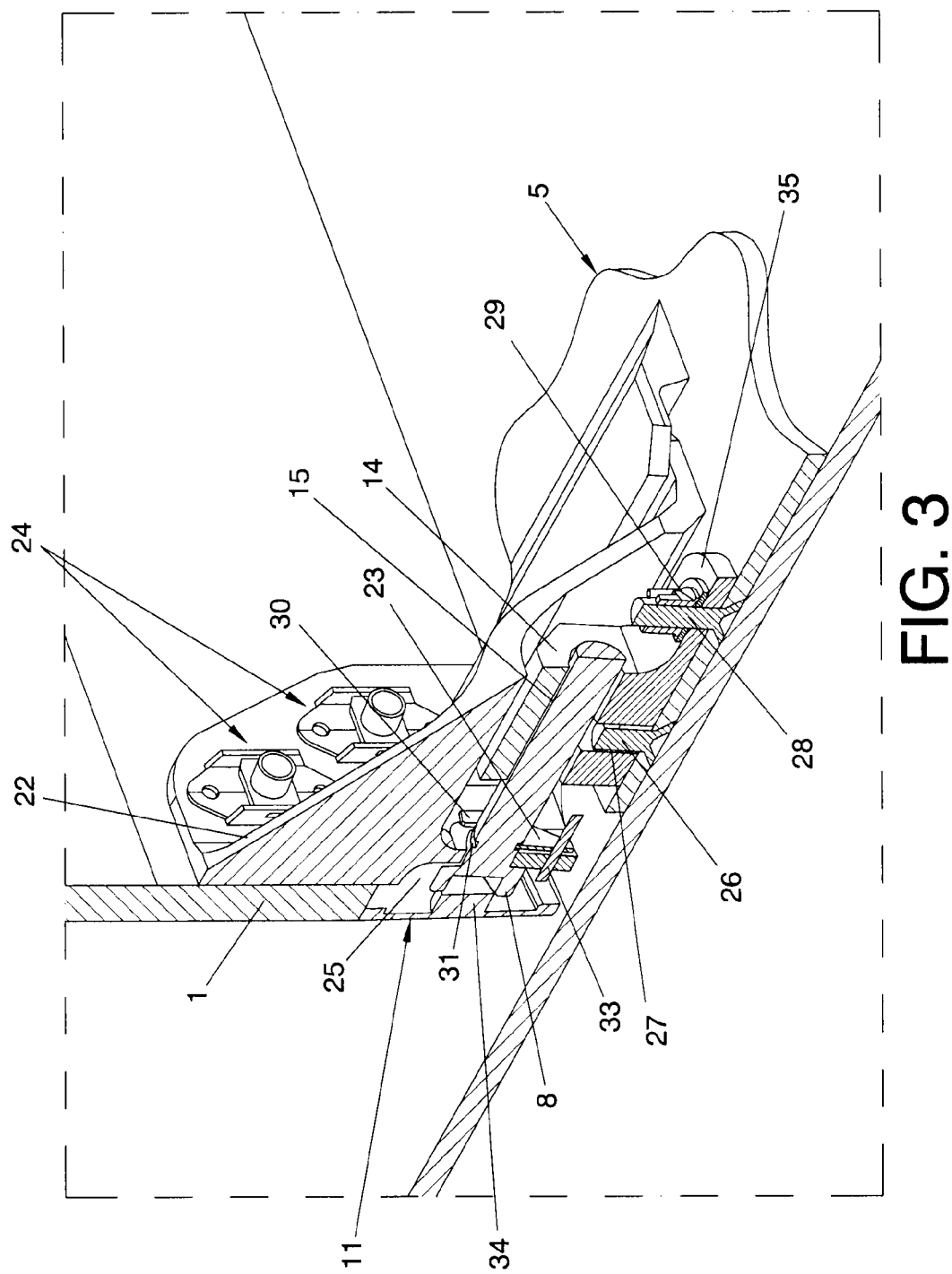
FIG. 3.—Shows a section view of the iron fitting shown in the previous figure.

Considering the numbering used in the figures, the adjustable iron fitting of the invention is designed to install and adjust fairings on aircraft and more specifically a fairing 1 that covers a cavity 2 located at the joint of a horizontal stabiliser 3 and a fuselage 4 of a structure of the aircraft.

A fairing 1 is installed and adjusted by a set of iron fittings.

Each iron fitting thus comprises a base plate 5 that is integrally joined to a torsion box 6 of the horizontal stabiliser 3, a mobile support 7 integrally joined to the respective fairing 1 and an adjustment screw 8 that associates and joins the said parts 5-7 and by which it is possible to cause the movement of one part with respect to the other in the longitudinal direction of the adjustment screw 8, such that the rotation of said screw shifts the mobile support 7 guided upon the base plate 5 and which therefore it also shifts with the rotation of the fairing 1 screw in order to provide fine adjustment thereof with respect to the outer side 9 of the fuselage 4, without requiring the repeated assembly and disassembly of the fairing during its installation and assembly as is currently the case.

The fairing 1 is in turn fastened with removable anchors 24 (screws, for example) to the mobile support 7 of the iron fitting, the fairing 1 being provided for such purpose with openings into which said removable components are installed and fastened.

Once each iron fitting has been mounted and joined to the fairing 1 and the torsion box 6, there are notches 10 located on part of the fairing 1 and coordinated with the position of the different iron fittings. The notches 10 allow the easy and practical access to the head of the adjustment screws 8. It is thus not necessary to disassemble the fairing 1 by removing the coupling screwed to the mobile support 7 of the iron fitting for adjustment, as is the case with other conventional iron fittings.

Once adjusted, the adjustment screw 8 is locked to ensure the blocking of the adjusted fairing 1. Each notch 10 is covered with a closing element, such as a lid 11 in order to reduce its aerodynamic and visual impact.

Figure 4:
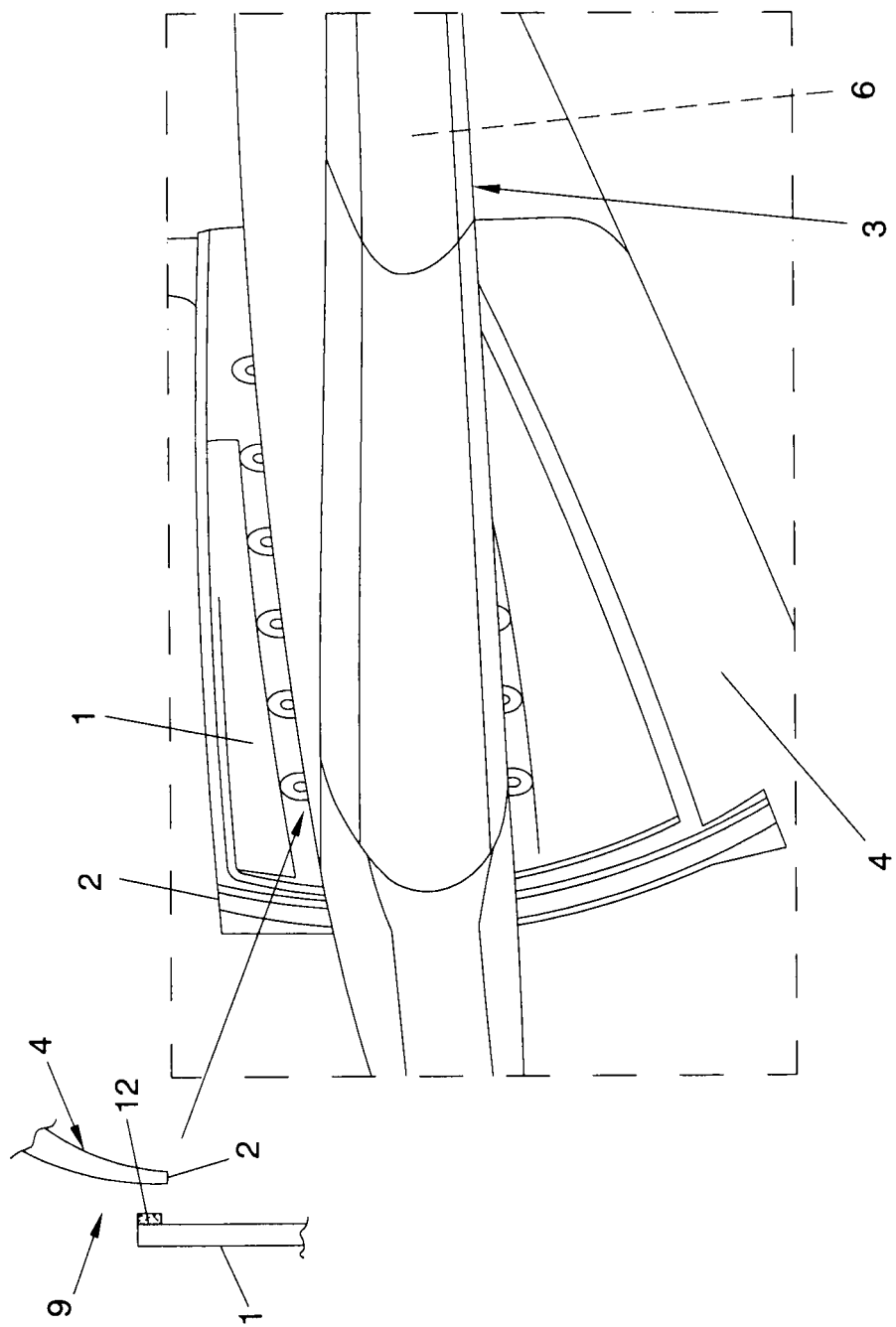
FIG. 4.—Shows a perspective view of part of a aircraft where a stabiliser joins the aircraft structure, defining in that area a hollow that is covered with a fairing that is installed and adjusted by a set of iron fittings of the invention. The fairing is installed on the outside of the fuselage.
Figure 5:
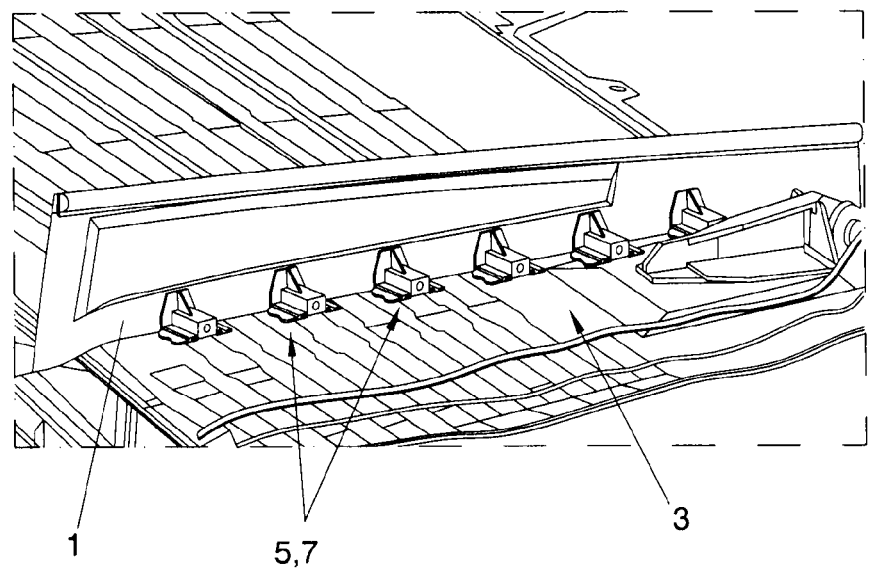
FIG. 5.—Shows a perspective view of the joining to the fairing via several iron fittings.
Figure 6:
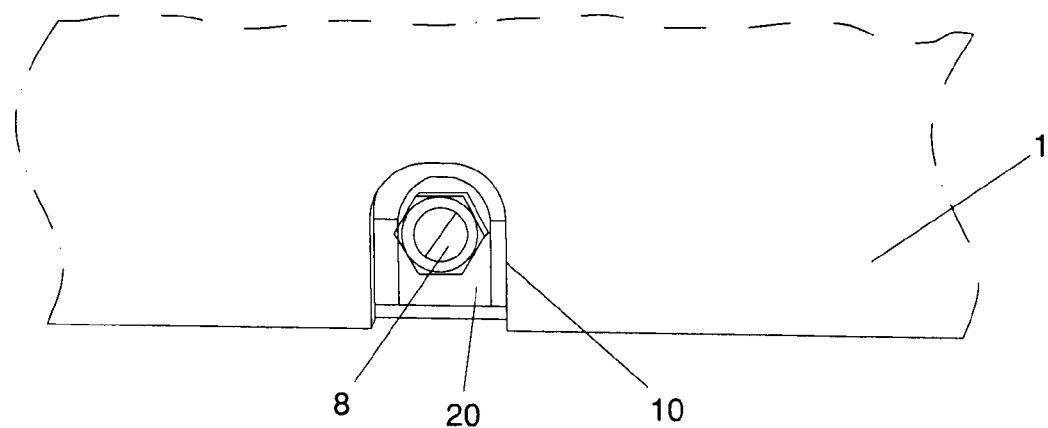
FIG. 6.—Shows a front view of the fairing highlighting a notch through which we can access the head of an adjustment screw of the respective iron fitting in order to install and adjust the fairing correctly.
Figure 7:
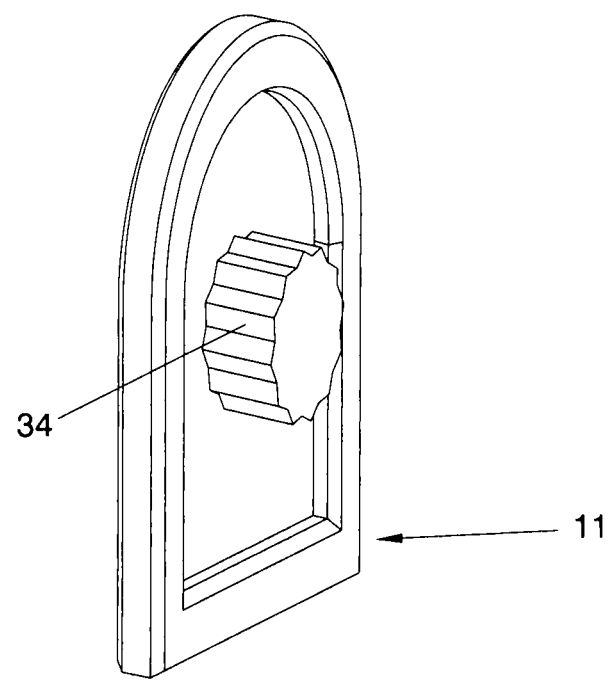
FIG. 7.—Shows a perspective view of a lid that closes a fairing recess associated to the iron fitting.

In an embodiment of the present invention the locking system for each iron fitting and the lid 11 are combined, with a lid that is designed to lock the rotation of the adjustment screw 8, thus reducing the number of components of the assembly and therefore its weight, which is essential in aeronautics (FIGS. 4 and 7). To do this, the lid incorporates a rib 34 that is housed inside a front hollow of the head of the adjustment screw 8.

Thus, by using a set of iron fittings of the invention it is achieved an installation consisting in alignments of iron fittings that can be adjusted independently, ensuring the correct position of the fairing 1 with respect to the fuselage 4, also ensuring correct sealing, since the fairing 1 incorporates a sealing profile 12 on its perimeter that settles on the outer side 9 of the fuselage 4.

The base plate 5 comprises a lower base 13 and a central body 14 provided with a threaded opening 15 into which it is coupled the adjustment screw 8, the lower base 13 incorporating in turn side channels 16 that line the central body 14 and into which the mobile support 7 is coupled and guided during its movement for installing and adjusting the fairing 1.

The mobile support 7 comprises a bridge structure 17 that is adapted to the central body 14 and which extends outwards in two coplanar extensions 18 that are adjusted and which slide along the side channels 16 of the base plate 5.

The bridge structure 17 is in turn joined on one end to a front wall 19 where there is a lower recess 20 inside the front base 25 of which there is a through hole 21 opposite a threaded opening 15 of the central body 14 of the base plate 5, starting the introduction of the adjustment screw 8 through said through hole 21, the head of said screw 8 being housed in such lower recess 20 opposite the respective notch 10 in the fairing 1, such that the rotation in one direction of the adjustment screw 8 drags the respective mobile support 7 inwards by its head, and therefore adjusts the fairing 1 frontally against the outer face 9 of the fuselage 4 with an intermediate sealing profile 12 that is fixed on the perimeter of the fairing 1 and which shifts in turn in the direction of the guide of such mobile support 7. On the other hand, when the adjustment screw rotates in the other direction, it drags the mobile support 7 outwards via a retaining plate 23 that is adjusted in a slot 31 of said adjustment screw 8.

The front wall 19 has an upper portion that joins the bridge structure 17 of the mobile support 7 via a longitudinal rib 22.

The mobile support 7 is attached to the base plate 2 via the adjustment screw 8 in combination with the retaining plate 23 which prevents said screw from falling outwards once installed.

The mobile support 7 is integrally joined to the fairing 1 by its front wall 19 by using anchoring elements 24, whereas the base plate 5 is integrally joined to the torsion box 6 of the horizontal stabiliser 3 via its lower base 13 with the help of other known fastening elements not shown in the figures.

The base plate 5 comprises two independent parts: a first part consisting of the lower base 13 and a second part consisting of the central body 14, which are joined to one another via a first screw 26 that crosses the lower base 13 and threads into a threaded opening 27 located in the lower portion of the central body 14 and a second screw 28 in combination with a nut 29, said second screw 28 crossing the lower base 13 and an end extension 35 that is an extension of the central body 14.

On the other hand, the retaining plate 23 comprises an open recess 30 the edge of which is adjusted into a ring slot 31 of the adjustment screw 8, the retaining plate 23 coming into contact against the inner face of the front base 25 of the mobile support 7, whereas the head of the adjustment screw 8 abuts against the outer face 25 of said front base with an intermediate retaining washer 32.

Thus, when the adjustment screw 8 is rotated in one sense or the other it will drag with it the mobile support 7, either inwards via the head of the adjustment screw 8 or outwards via said retaining plate 23.

The iron fitting of the invention also comprises anti-rotation locking means in the retaining washer 32 in order to prevent the rotation of the adjustment screw 8 and the retaining plate 23, means that consist in a retaining element 33 that crosses part of the retaining ring 32, the front base 25 of the mobile support 7 and also crosses a lower part of the retaining plate 23.

The function of the retaining ring 32 is reinforced by providing on the lid 11 that closes the recess 10 of the fairing 1 a rib 34 that will additionally be housed in the hollow of the head of the adjustment screw 8.

The invention claimed is:

1. An adjustable iron fitting for the installation and fitting of aircraft fairing, that being designed to install and adjust, in conjunction with other iron fittings, a fairing on an aircraft in correspondence with a cavity located at the junction between the stabiliser and the fuselage of an aircraft structure, wherein each iron fitting comprises;
    a base plate joined integrally to a torsion box of the stabiliser;
    a mobile support joined integrally to the fairing and which is guided, over a linear movement, over the base plate;
    an adjustment screw that is coupled into a threaded opening of the base plate, which screw joins this base plate to the mobile support, with the rotation of said adjustment screw dragging the respective mobile support linearly by the head of a adjustment screw and in the opposite linear direction via a retaining plate associated to the adjustment screw.

2. The adjustable iron fitting for the installation and fitting of aircraft fairing according to claim 1, wherein the base plate comprises a lower base and a central body provided with the threaded opening into which is coupled the adjustment screw, the lower base incorporating in turn side channels that line the central body and into which the mobile support is coupled and guided during its movement for installing and adjusting the fairing against an outer side of the fuselage.

3. The adjustable iron fitting for the installation and fitting of aircraft fairing according to claim 2, wherein the mobile support comprises a bridge structure that is adapted to the central body of the base plate and which extends outwards in two coplanar extensions that are adjusted and which slide along the side channels of the base plate.

4. The adjustable iron fitting for the installation and fitting of aircraft fairing according to claim 3, wherein the bridge structure is joined on one end to a front wall that is also part of the mobile support, which front wall is split by a lower recess inside a front base of which there is a through hole opposite the threaded opening in the central body of the base plate, the head of the adjustment screw being housed in said lower recess with a notch of the fairing.

5. The adjustable iron fitting for the installation and fitting of aircraft fairing according to claim 4, wherein the mobile support includes a longitudinal rib joined to an upper portion of the front wall and which is also joined to the bridge structure, both of which are elements forming said mobile support.

6. The adjustable iron fitting for the installation and fitting of aircraft fairing according to claim 2, wherein the base plate is joined to the torsion box of the stabiliser via its lower base.

7. The adjustable iron fitting for the installation and fitting of aircraft fairing according to claim 4, wherein the mobile support is joined to the fairing by its front wall using anchoring elements.

8. The adjustable iron fitting for the installation and fitting of aircraft fairing according to claim 1, wherein the base plate comprises two independent parts: a first part determined by a lower base and a second part formed by a central body that is joined to the lower base at at least two anchor points.

9. The adjustable iron fitting for the installation and fitting of aircraft fairing according to claim 8, wherein the two independent parts of the base plate are joined to one another via a first screw that crosses the lower base and threads into a threaded opening located in the lower portion of the central body and a second screw in combination with a nut, said second screw crossing the lower base and an end extension that is an extension of the central body.

10. The adjustable iron fitting for the installation and fitting of aircraft fairing according to claim 4, wherein the retaining plate comprises an open recess an edge of which is adjusted into a ring slot of the adjustment screw, the retaining plate coming into contact against the inner face of the front base of the mobile support, whereas the head of the adjustment screw abuts against the outer face of said front base with an intermediate retaining washer.

11. The adjustable iron fitting for the installation and fitting of aircraft fairing according to claim 10, wherein it comprises anti-rotation locking means in the retaining washer and the retaining plate, means that consist in a retaining element that crosses part of the retaining washer, the front base of the mobile support and also crosses a lower part of the retaining plate.

12. The adjustable iron fitting for the installation and fitting of aircraft fairing according to claim 11, wherein it includes a lid embedded in the notch of the fairing, which lid has on its inner face an anti-rotation rib that is housed inside a front hollow of the head of the adjustment screw.

* * * * *